US012514774B2

(12) United States Patent
Janzen

(10) Patent No.: US 12,514,774 B2
(45) Date of Patent: Jan. 6, 2026

(54) SPINAL WEIGHTING DEVICES

(71) Applicant: ScoliWRx Inc., Campbell, CA (US)

(72) Inventor: Matthew I. Janzen, Campbell, CA (US)

(73) Assignee: ScoliWRx Inc., Campbell, CA (US)

( * ) Notice: Subject to any disclaimer, the term of this patent is extended or adjusted under 35 U.S.C. 154(b) by 0 days.

(21) Appl. No.: 18/536,835

(22) Filed: Dec. 12, 2023

(65) Prior Publication Data

US 2024/0108531 A1 Apr. 4, 2024

Related U.S. Application Data

(63) Continuation of application No. 16/721,407, filed on Dec. 19, 2019, now Pat. No. 11,839,579, which is a continuation of application No. 14/814,941, filed on Jul. 31, 2015, now abandoned.

(60) Provisional application No. 62/032,048, filed on Aug. 1, 2014.

(51) Int. Cl.
*A61H 1/02* (2006.01)

(52) U.S. Cl.
CPC ... *A61H 1/0292* (2013.01); *A61H 2203/0406* (2013.01); *A61H 2203/0475* (2013.01)

(58) Field of Classification Search
CPC .. A61G 7/0527; A61G 13/009; A63B 21/065; A63B 21/4005; A63B 21/4007; A63B 23/0233; A63B 23/0238; A63B 23/0244; A61H 2201/0134; A61H 2203/0406; A61H 2203/0475; A61H 2203/0481; A61H 2203/0487; A61H 2003/006; A61H 3/00; A61H 3/008; A61H 1/0292; A61H 1/006; A61H 1/008; A61H 1/02; A61H 1/0218; A61H 1/0222; A61H 1/0262; A61F 5/01; A61F 5/0102; A61F 5/02; A61F 5/022; A61F 5/024; A61F 5/026; A61F 5/028; A61F 5/03; A61F 5/04; A61F 5/042; A61F 5/048; A61F 5/37; A61F 5/3761; A61F 5/3769
USPC ............... 602/32, 36, 38–40, 19; 601/23, 84
See application file for complete search history.

(56) References Cited

U.S. PATENT DOCUMENTS 4,775,150 A * 10/1988 Graham ............... A61H 1/0218 482/134
5,943,700 A * 8/1999 Hammer ............. A63B 21/065 2/102
8,113,999 B2 * 2/2012 Falter ..................... A63B 69/18 482/148

(Continued)

FOREIGN PATENT DOCUMENTS

JP 2014158540 A * 9/2014
WO WO-2009154764 A1 * 12/2009 ........... A61B 5/4023

OTHER PUBLICATIONS

JP 2014158540A translation (Year: 2014).*

*Primary Examiner* — Caitlin A Carreiro
(74) *Attorney, Agent, or Firm* — Penilla IP, APC

(57) ABSTRACT

A spinal weighting device has pairs of adjustable padding on supporting frames for making contact with selected portions of the core or trunk of a patient and includes an extending armature for applying force to urge at least one of the contacting pads to adjust the spine and/or cause the selective strengthening of muscles or muscle groups to correct scoliosis. The opposing padding members are disposed at oblique angles to correct spinal rotation as well as lateral curvature.

20 Claims, 10 Drawing Sheets

(56) References Cited

U.S. PATENT DOCUMENTS

2003/0181295 A1* 9/2003 Hanson, III ......... A63B 21/065
482/92

* cited by examiner

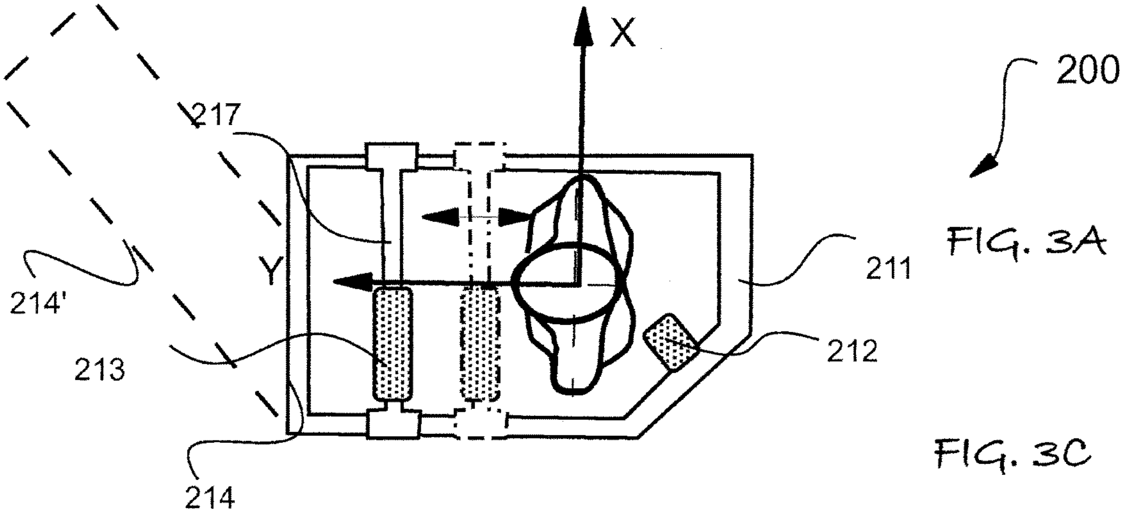
FIG. 3A
FIG. 3C
FIG. 3B
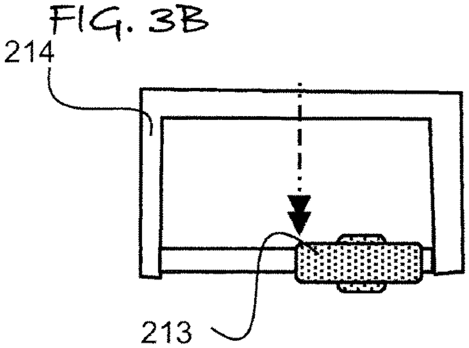
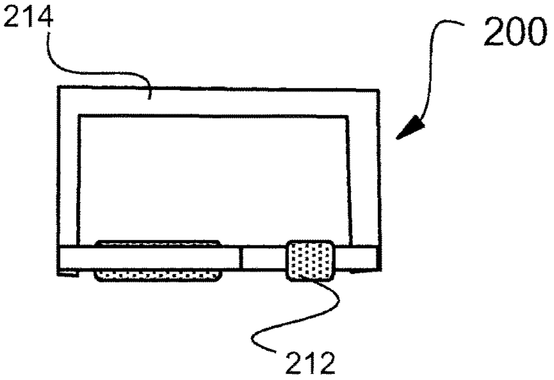
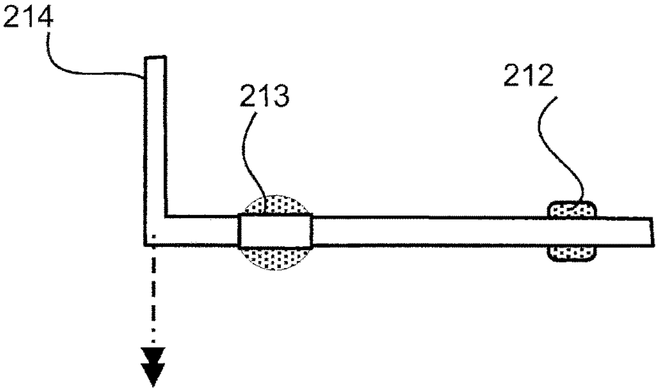
FIG. 3D

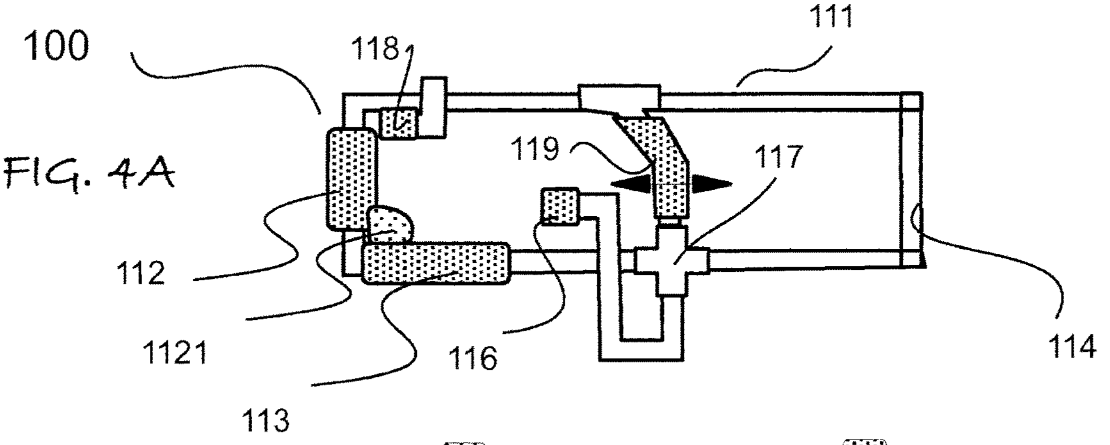
FIG. 4A
FIG. 4E
FIG. 4D
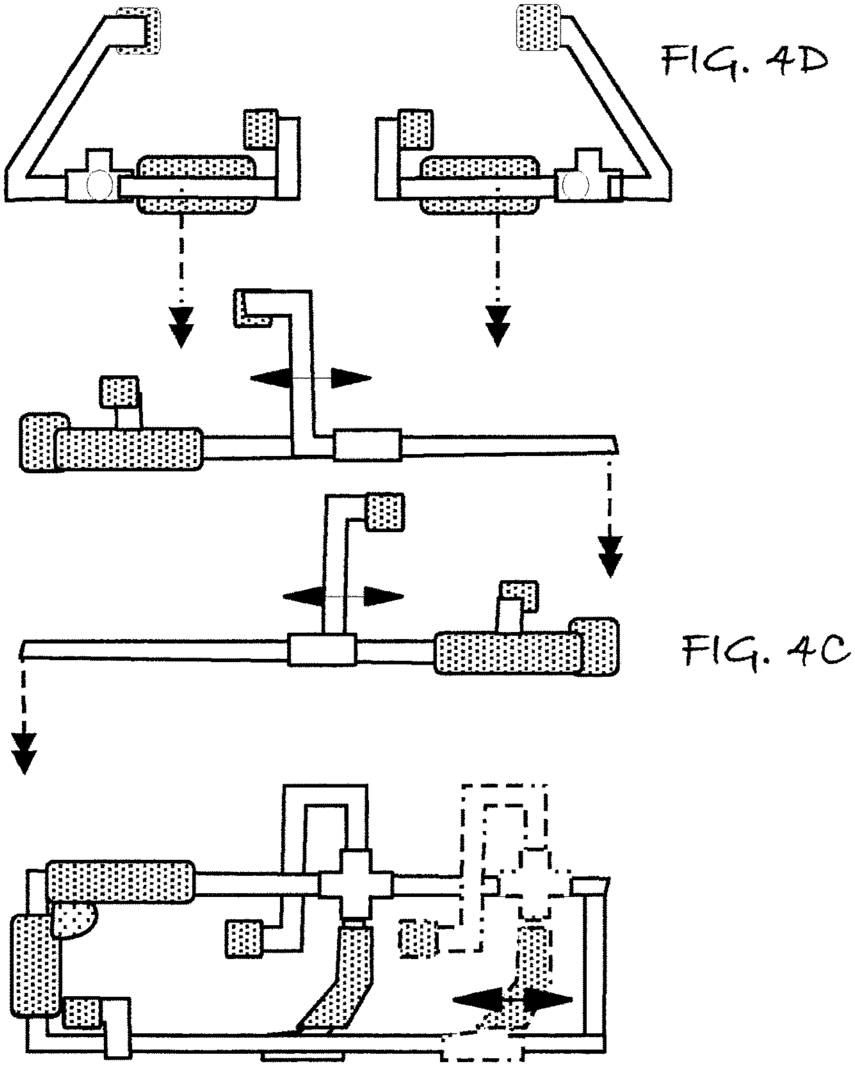
FIG. 4B
FIG. 4C
FIG. 4F

FIG. 10A
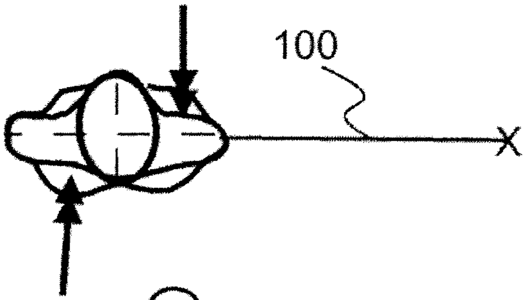
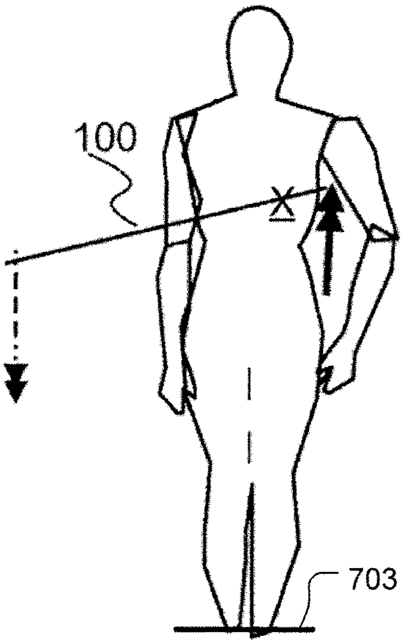
FIG. 10C
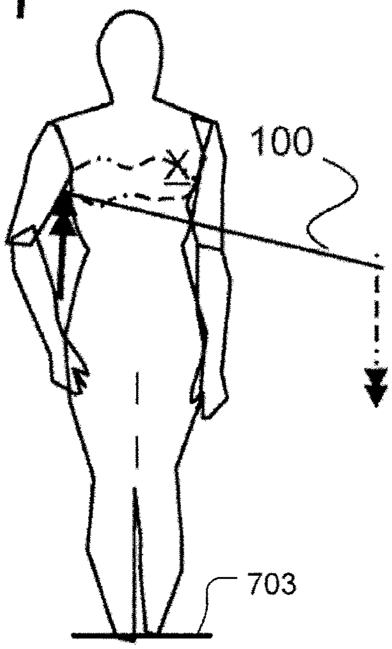
FIG. 10B
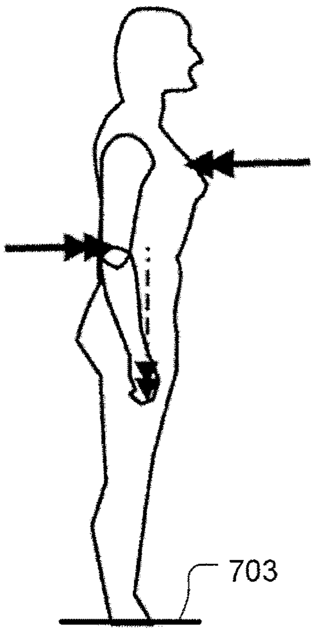
FIG. 10D

SPINAL WEIGHTING DEVICES

CLAIM OF PRIORITY

This application is a continuation application under 35 U.S.C. 120 of prior filed U.S. patent application Ser. No. 16/721,407, filed Dec. 19, 2019, issued as U.S. Pat. No. 11,839,579, on Dec. 12, 2023, which is a continuation application under 35 U.S.C. 120 of prior filed U.S. patent application Ser. No. 14/814,941, filed Jul. 31, 2015, which claims priority under 35 U.S.C. 119(e) to U.S. Provisional Patent Application No. 62/032,048, filed on Aug. 1, 2014. The disclosure of each above-mentioned application is incorporated herein by reference in its entirety for all purposes.

BACKGROUND

The field of inventions is devices to correct spinal deformities, in particular spinal scoliosis.

External weighting devices and braces, as well as exercises have been used separately and together to correct various types of curvatures of the spinal, known as scoliosis. Some conditions cannot be fully corrected, and if they progress may necessitate spinal surgery procedures, including fusion and/or the implantation of medical devices to internally support the spine in a correct position. Hence, it is desirable to provide such corrective methods to patients to avoid future surgical intervention which poses risks, expense and at least temporary absence of the patient from work and/or school.

However, some types of scoliosis are resistant to correction with prior art weighting devices and braces, and only partial correction can be achieved.

Accordingly, there is a need for improved weighting devices, braces and exercise routines that more effectively treat scoliosis.

The above and other objects, effects, features, and advantages of the present invention will become more apparent from the following description of the embodiments thereof taken in conjunction with the accompanying drawings.

SUMMARY

In the present invention, the first object is achieved by providing a corrective weighing device comprising: a frame portion for fitting to a patient, an armature for receiving one or more weights extending away from the frame in a first direction, a padded first contact member on one side of the frame, a padded second contact member on another side of the frame that opposes the first contact member, wherein at least one of the first and second contact members are disposed at an oblique angle with respect to the first direction.

A second aspect of the invention is characterized such a corrective weighting device wherein one of the first and second padded contact members are adjustable in distance from the other.

Another aspect of the invention is characterized such a corrective weighting device wherein the armature is operative to translate laterally from at least one of the first and second padded contact members.

Another aspect of the invention is characterized such a corrective weighting device further comprising a third padded contact member coupled to the frame.

Another aspect of the invention is characterized such a corrective weighting device further comprising a supporting strap extending across the frame in a direction generally orthogonal to the first direction for hanging the frame from a shoulder.

Another aspect of the invention is characterized such a corrective weighting device wherein the first and second padded member are in a first common plane that is substantially parallel to the first direction and the third padded contact member is disposed out of the first common plane.

Another aspect of the invention is characterized such a corrective weighting device further comprising a fourth padded contact member coupled to the frame that is disposed out of the first common plane on the same side thereof as the third padded contact member.

Another aspect of the invention is characterized such a corrective weighting device wherein one of the first and second contact members has an addition mode of adjustment in position with respect to the other contact member.

Another aspect of the invention is characterized such a corrective weighting device wherein the first and second padded member are in a first common plane that is substantially parallel to the first direction and the third padded contact member is disposed out of the first common plane.

Another aspect of the invention is characterized such a corrective weighting device wherein one of the first and second padded contact members is formed by strapping that extends between portions of the frame.

Another aspect of the invention is characterized such a corrective weighting device wherein one of the first and second padded contact members is formed by strapping that extends between portions of the frame.

Another aspect of the invention is characterized such a corrective weighting device wherein the one padding member is curved padded portion of the frame with a concave side for contacting the patient and the second padded contact members is formed by strapping that extends between portions of the frame that are opposite the concave side of the curved padded portion of the frame.

Another aspect of the invention is characterized by a method of using a corrective weighting device to treat scoliosis comprising the steps of fitting one or more spinal weighting devices (SWD) to a patient, at least one of the spinal weighting devices comprising; a frame portion for fitting to a patient, an armature for receiving one or more weights extending away from the frame in a first direction, a padded first contact member on one side of the frame, a padded second contact member on another side of the frame that opposes the first contact member, applying at least one weight on the armature of the weighting device wherein the first padded member contact the front of the patient and the second padded member contacts a side of the patient wherein at least one of the first and second contact member applies a torque to de-rotate at least a portion of the spine of the patient.

Another aspect of the invention is characterized such a method wherein the SWD is at least one of a Dorsal Upper Dorsal Shoulder Lever Arm (DUD SLA), a Lumbo Pelvic Derotator (LPD), Thoraco Lumbar Translator (TLT) and a Locking Lumbar Leverarm (LLL).

Another aspect of the invention is characterized such a method wherein a first SWD is a DUD SLA and a second CWD is a LPD.

Another aspect of the invention is characterized such a method that further comprises a step of apply a resistance band between the DUD SLA and the LPD.

Another aspect of the invention is characterized such a method wherein the SWD is a DUD SLA having a strap connecting opposing portions that are generally in the orthogonal direction to the armature and wherein said step of placing the DUD SLA on the patient comprises placing the strap over the concave side of the primary tsp curve of the patient.

Another aspect of the invention is characterized by a corrective weighting device comprising a frame portion for fitting to a patient, the frame having a curved padded portion with a concave side for contacting the patient and an opposing convex side, an armature for receiving one or more weights extending away from the convex side of the curved padded portion of the frame, a first straps strap attached to opposing sides of the frame for tensioning on a torso above a hip of the patient to urge the curved padded portion a hip bone of the opposite side of the torso.

Another aspect of the invention is characterized such a corrective weighting device wherein the first strap has axial pivoting connections to the frame at opposing ends thereof.

Another aspect of the invention is characterized such a corrective weighting device wherein the armature is operative to translate laterally from the curved padded contact portion of the frame.

The above and other objects, effects, features, and advantages of the present invention will become more apparent from the following description of the embodiments thereof taken in conjunction with the accompanying drawings.

BRIEF DESCRIPTION OF THE DRAWINGS

FIG. 1A is a top plan view of a human body, whereas

FIGS. 1B and 1C are front and side elevation view respectively showing a reference coordinate system, whereas

FIG. 2A is a top plan view of the generic embodiment of FIG. 1D, whereas

FIG. 3A is a top plan view of the DUD SLA 100 embodiment of the invention, whereas FIG. 3B is a right side elevation view thereof, FIG. 3C is a left side elevation thereof, FIG. 3D is a front elevation view thereof.

FIG. 4A is a top plan view of LPD 200 embodiment of the invention, whereas FIG. 4B is a front side elevation view thereof, FIG. 4C is a back side elevation thereof, and FIG. 4E is a right side elevation, FIG. 4D is a left side elevation and FIG. 4F is a bottom plan view thereof.

FIG. 10A-D illustrates the forces applied to the body by the DUD-SLA device of FIG. 3A-F.

DETAILED DESCRIPTION

Figure 1D:
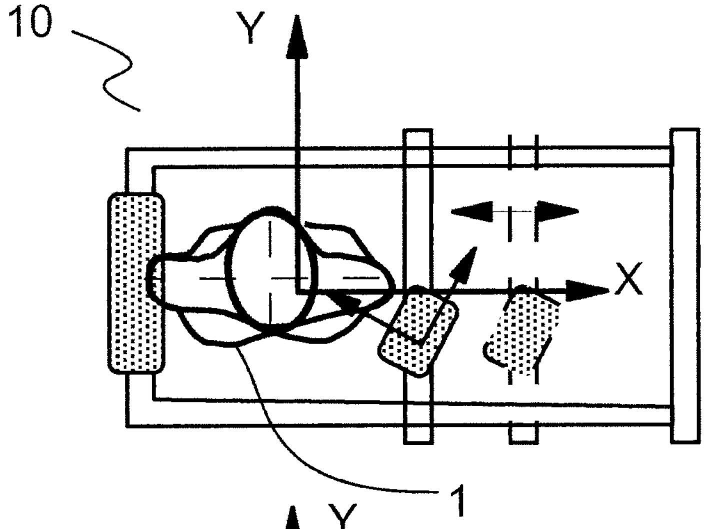
FIG. 1D is the top plan view of FIG. 1A showing the patient fitted with a generic embodiment of the inventive device.

Referring to FIGS. 1A through 10D, wherein like reference numerals refer to like components in the various views, there are illustrated new and improved Spinal Weighting Devices, generally denominated 1000 herein, as well as methods of use. In accordance with the present invention the Spinal Weighting Devices 1000 comprise at least one of a Dorsal Upper Dorsal Shoulder Lever Arm (DUD SLA) 100 and a Lumbo Pelvic Derotator (LPD) 200, Thoraco Lumbar Translator (TLT) 300 and the Locking Lumbar Leverarm (LLL) 400.

FIG. 1-10 may use the following diagram conventions in which double headed arrows indicate a force vector position and its direction, in which arrows formed of broken lines indicate the placement of adjustable weights and in which solid line arrows indicate the reactive force generated against the patient by the weight. Arrows with single heads at both opposing ends indicate the potential directions for adjustment of moving portions of the inventive devices. Pairs or triplets of orthogonal arrows labeled x, y or z represent coordinate directions, whereas X indicates the position of an adjustable weight that applies a force orthogonal to the plane of the paper. An underscored X indicated the direction of a force vector applied to a portion of the patient, as a result of the adjustable weight.

It should be understood that the weighting devices disclosed herein need not have frames with the external shapes indicated in the diagrams to have a therapeutic benefits, as the functional aspect of the frames are to transfer force from a weight hanging from an armature or extension of the frame to a generally padded frame portions that contact the body at specific locations. The frame member serves to position the padded or other body contacting portion at different positions and orientation to apply the desired adjustment of force suitable for each patient. As particular muscles or muscles sets of patients grow stronger and/or as patients grow, the weights or the force applied by the weights can be increased accordingly during the treatment process.

The inventive weight devices are intended to be worn in relatively short sessions (10 to 45 minutes) while standing on balance pads 703. The device or device combination when worn together, are selected by the practitioner depending on the specific pathology of the patient, and adjusted for an anatomical fit.

The DUD SLA 100, LPD 200, TLT 300 and the LLL 400 are constructed to provide unique force vectors at specific contact points with the patient when properly fitted and worn by the patient with biasing weights. Each of these device have an armature portion that is preferably weighted at the distal end acts as a cantilever to amplify the bias weight to transmit the inventive force vectors at the specific contact points on the patient. The length of the armature portion is optionally adjustable in length to position weights more distal from the padding or strapping that contact the patient.

The transfer of weight to specific points according to the inventive constructions aids in correcting various forms of complicated scoliosis without surgical intervention. It should be appreciated that not all points of contact with the body provide a corrective force, as some portions of contact, such as from straps and the like that extend over shoulders are merely to provide vertical support and stability so the frames do not fall off the patient.

During active exercise correction occurs at least in part while the patient wears the inventive devices, and also at least in part by the strengthening of unique muscles or muscles while wearing the inventive devices. The patient stands on a balance pad 703 while wearing the inventive devices. As the patient will tip over unless specific muscles provide resistance to movement, these muscles are selectively strengthened. In the inventive methods the selectively strengthened muscles continue to correct the spinal deformity passively, that is when the patient is not wearing the devices. However, the devices are also configured to provide some direct corrective forces to the patient's spine at contact points while they are wearing them. The contact points are padded and fitted to the patient anatomy of support on the patient by one or more strap or belts. The padded parts of the equipment do provide corrective forces to the spinal deformity, especially in the direction of rotation. This is not where the primary intended corrected effect comes from, as the device is worn too short a time for any correction from these forces. It is the way the device loads that body so that it will either fall over, or balance against the weight with a straighter posture of the spine. Since the device must contact the body somewhere, we make sure that the device contacts the body in a way that is corrective—both for lateral bending and rotation. The fact that we do push the rotation out with the pads makes it easier for the body to react in a direction that straightens and further de-rotates the scoliosis.

The position of the strap or belts on the body, as well as the connection to the DUD SLA 100 and the LPD 200 establishes the vectors coordinates. A vector should be understood to be the orientation of a force in 3 dimensions which is characterized by a magnitude and direction. The direction is with respect to a coordinate system which can arbitrarily by Cartesian or Spherical, with the former characterized by an x and y distal coordinates, and the latter characterized by a pair of angular coordinates.

The straps and frame are adjustable to optimize the anatomical placement of the pads and the optimal placement of corrective weights on the armature portions of the frame.

The following terms are used herein:

Tsp—Thoracic Spine

Dorsal Spine—Thoracic spine—older terminology for Thoracic Spine

DUD—Dorsal-Upper Dorsal—defines the region of the spine that is represented by the upper half of the Thoracic spine—the Upper half of the Dorsal Spine A prior art device that is improved by current invention is the SLA—The Shoulder Lever Arm. This is the standard device as utilized by Dr. Woggon and CLEAR doctors. It consists of a simple rectangular PVC frame about 9"×36", with a strap that lies over the shoulder on the convex side of the primary tsp curve. The inventive DUD-SLA 100 has a more complex and beneficial application of force that is illustrated in FIG. 10.

Figure 5:
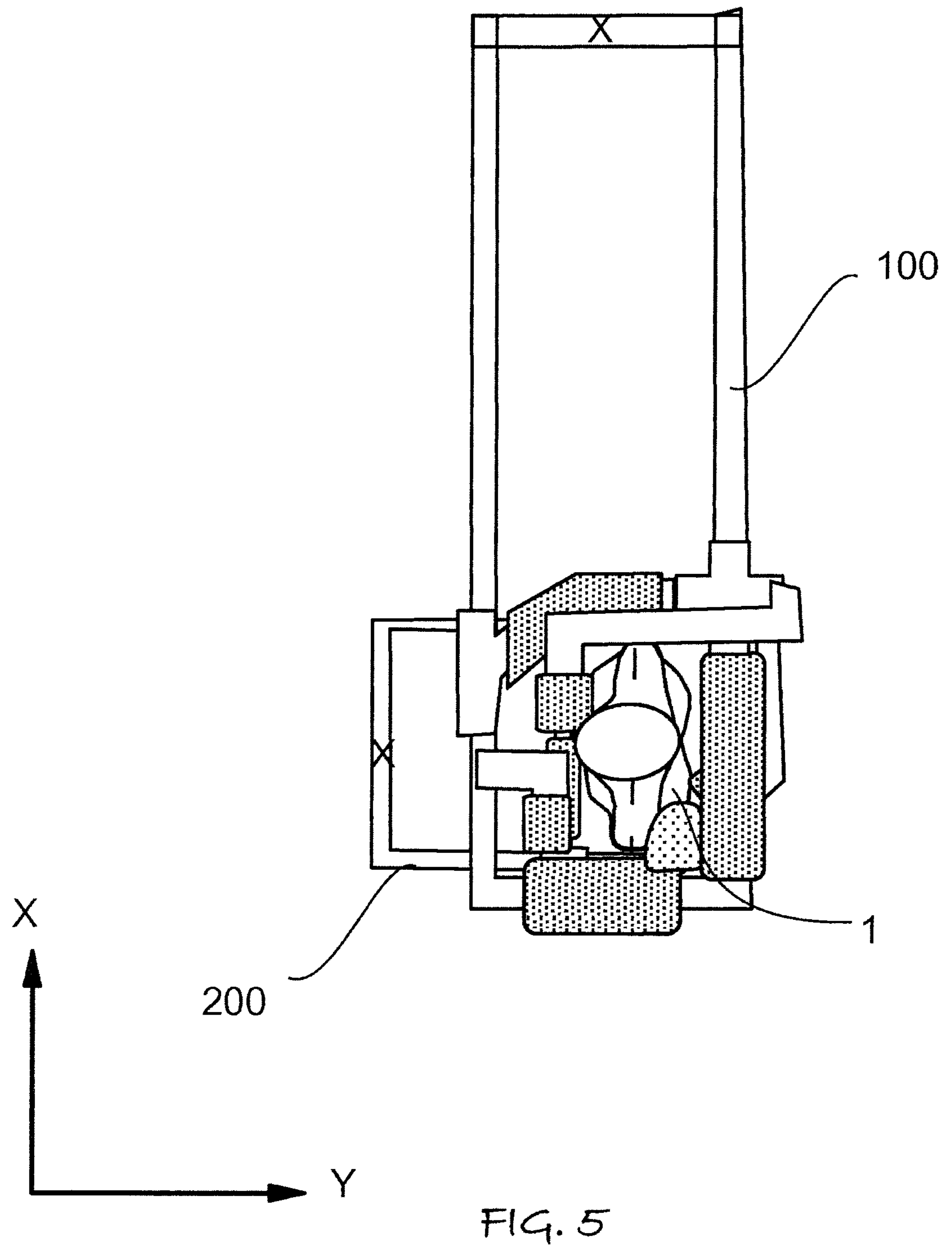
FIG. 5 is a top plan view showing the patient fitted with the DUD SLA 100 device of FIG. 3A-E and the LPD device 200 of FIG. 4A-E.

While the padded parts of the equipment do provide corrective forces to the spinal deformity, especially in the direction of rotation, this is not the source of the primary intended corrected effect, as the device is worn too short a time for any correction from these forces. The inventive device is intended to load the body so that the patient naturally balances against the weight with a straighter posture of the spine to avoid falling over. An inventive aspect of the devices is that as they must contact the body somewhere, they are configured to do so in a way that is corrective—both for lateral bending and rotation of the spine. The body contacting portions of the device are generally configured to remove the mal-rotations of the specific scoliotic conditions facilitating the natural body reaction in a direction that straightens and further de-rotates the scoliosis. For example, the Dorsal Upper Dorsal Shoulder Lever Arm (DUD SLA) device 100 corrects abnormal twist between the upper thoracic and middle thoracic curves. The Lumbo Pelvic Derotator (LPD) device 200 corrects abnormal twist between the pelvis and lumbar apex. The area between the lumbar apex and the thoracic apex must fully correct under its own muscular strength. In a method of using the inventive device, this can be enhanced by applying a resistance band between the DUD SLA 100 and the LPD 200 when they are both worn at the same time, as shown in FIG. 5.

The various embodiments apply the weight in such a way that the muscle sets that responds also untwist the spine as they straighten it. In some embodiment, the body reacts above the contact point on the posterolateral spine. The vertebra above must pull into a straighter and de-rotated posture in response the weight on the anterior aspect and lateral aspect of the device.

The frames are generally rectangular to provide an outward extending armature as a means to bias the padding on the frame; frame merely positions the padding in a rigid respective orientation. Padding may be soft compressive material, such as foam, as well as elastic fabrics and strap. While some form of the frame are supported on the patient by compression between padding, in preferred embodiments strap positioned above the frame, as well as buttress type supports below the frame provides orientation stability of the frame on the patient. Padding illustrated on selected portion of the frame may contain excess material for the purpose of the ease of adding and stabilizing the padding that need to be padded are just those that contact the patient.

Figure 1A:
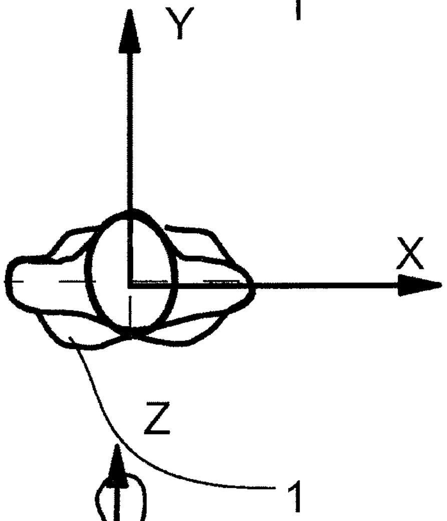
Figure 1B:
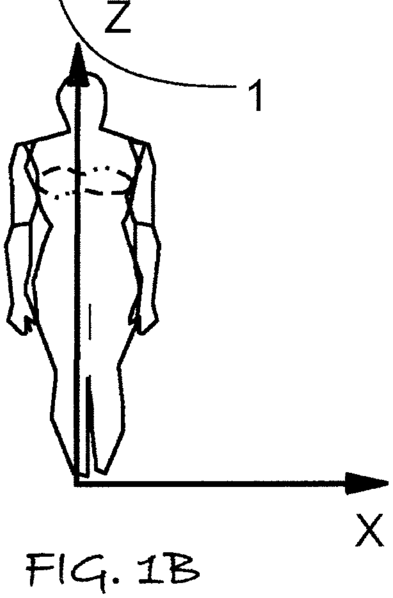
Figure 1C:
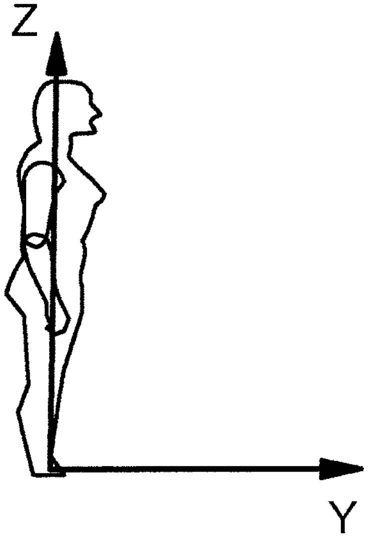

FIG. 1A is a top plan view of a patient as a generic normal human body 1, whereas FIGS. 1B and 1C are front and side elevation view respectively showing a reference coordinate system, whereas FIG. 1D is the top plan view of FIG. 1A showing the patient fitted with one generic embodiment of the inventive device 10. Device 10 in FIGS. 1D and 2A-E comprises a frame 11, with padding member 12 and 13 covering portions of the frame and an armature portion 14 of the frame 11 disposed distal from the padding member 12. In use, the frame 11 is removably detached from the patient and weights 15 are hung from a portion of the armature 14. At least one portion the frame 17 having a padding member 13 is adjustable with respect to the distance from the other padding member 12. The adjustability of at least portion 17 allows both pads 12 and 13 to be urged together to contact the patient. Generally rectangular padding member 13 is deployed in the case of a generally rectangular frame oriented on the sliding frame portion 17 at an oblique angle with respect to the primary axis of pad 12 so that when the sliding frame portion 17 supporting the other generally rectangular or cylindrical padding member 13 is slid toward padding member 12, which contacts a side of the patient, padding member 13 will contact the front or back of the patient. If the frame 10 is rotated 90 degrees in the X-Y plane, then the padding member 12 contacts the front (or back) of the patient, and the other padding member 13 is likewise adjusted to contact the side of the patient when member 17 is adjusted. Accordingly, a common aspect to many embodiments of the invention is that one padding member is at least at an oblique angle with respect to the other padding members to facilitate de-rotation during exercise.

Figure 2A:
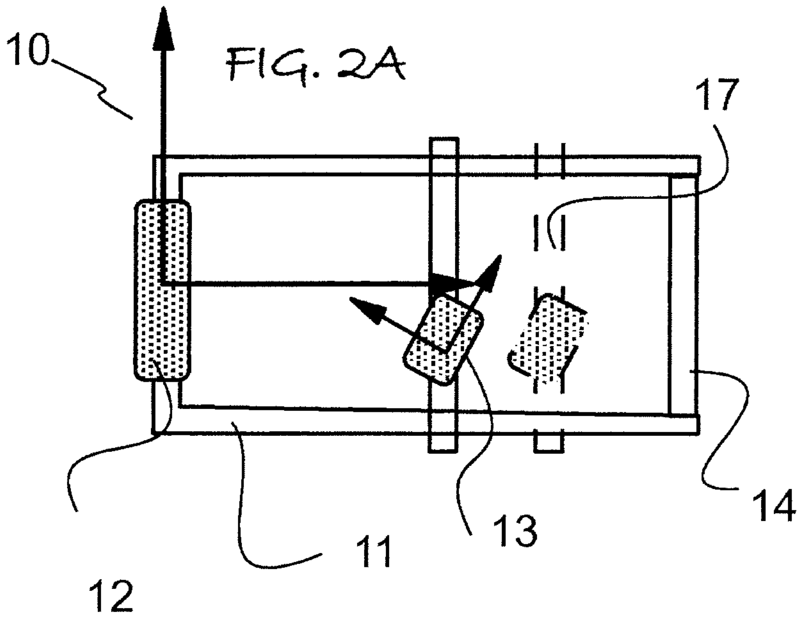
Figure 2B:
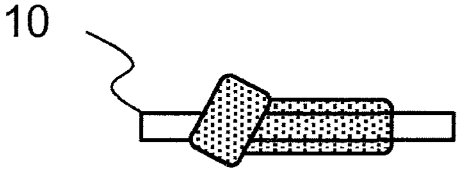
FIG. 2B is a front side elevation view thereof.
Figure 2C:
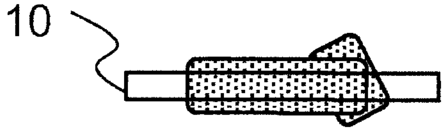
FIG. 2C is a back side elevation thereof.
Figure 2D:
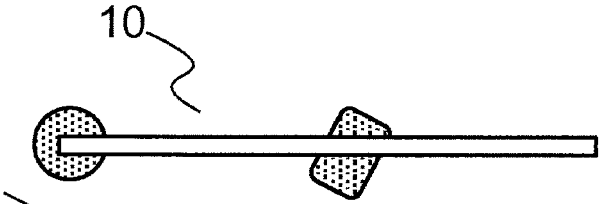
FIG. 2D is a right elevation view thereof and FIG. 2E is a left elevation view thereof.
Figure 2E:
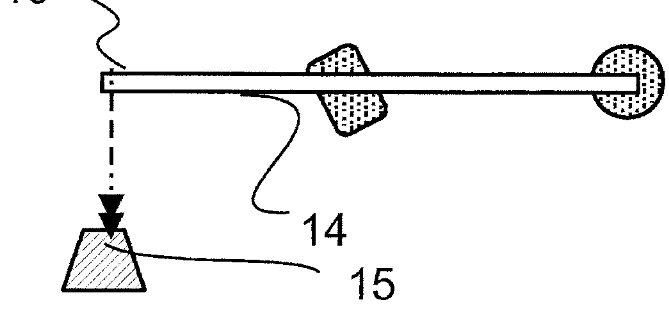

The frame and padding can have alternative shapes that achieve the inventive benefit of contact a side and a front of the patient when so fitted so that the patient can wear device 10 while a weight 15 is hung from armature 14, a shown in FIG. 2E. The side and front contact can be achieved by various angulations of the frame components and/or appropriate shaping of the frame components to achieve the contact positions and force vectors described with respect to the preferred embodiments, to provide functional equivalents. For example, the frame can be rectangular, but the padding can be angulated to provide the same body contact and force application as an angle in the frame and rectangular padding surrounding the frame components. In selected embodiments the padding members are straps to conform to the body or the padding or frame are curved to conform to the body shape for distributing the load supplied by the weighted armature.

It should also be understood that a strap or strapping member generally means a wide flexible band that can conform somewhat to the patient's body to distribute stress or apply it over a particular area for comfort and/or therapeutic benefit and may deploy additional parts or padding for this purpose. When supported in an at least semi-taught state one or more straps can acts as a padding member. As the inventive frame can be modified in various ways to accommodate different shaped padding, it can also be modified to deploy straps as padding or for suspending the device over the patient, typically over a shoulder.

When the frame is adjusted to fit the patient, it can be locked in the adjusted position with simple clamps on the sliding or adjustable portions. When a removable clamp is placed on a portion of the frame that slides by telescoping from within wide portion, the clamp limits the movement back into the wider portion. Alternatively, clamps can straddle the narrower telescoping inner portion and the wider receiving portion limit movement in either direction. Clamps can be replaced with screws, pegs and the like which extend through and connect the narrower and wider portions. While a preferred construction is from tubular PVC (Polyvinyl chloride), as it is light weight and relatively x-ray transparent, nothing precludes constructing the frame from other combinations of materials and linear members, including sliding rail portions to confer adjustability. Piping is preferred because of the availability of elbow joints of different angles, as well as T and 4-way orthogonal junctions. Nonsliding junctions of linear frame components can be joined with such junctions using glues, welding, soldering as well as screws, pins and bolts and the like.

In the DUD SLA 100 of FIGS. 3A-E and 5, a padding member 112 is configured on the frame 111 to be fitted under the armpit to position one of the orthogonal padding member 113 across the stomach so that the curved padding member 119 that is generally opposite of padding 112 and contacts the opposing side and back portions of the patient 1. Padding 113 and 119 are both attached to sliding member 117 to position padding member 116 in contact with the upper chest while padding member 118 contacts the opposing side of the back just above the hip. Padding member 1121 also contacts the patient at the junction of their opposing side and front from padding member 116. The frame 111 also includes straps (shown in other Fig's), to suspend the padding in a vertical position from the shoulders of the patient when sliding member 117 is displaced so that both padding member 112 and 119 contact opposing side of the patient. In the most preferred embodiment, all part of the frames or device intended to contact the patient are adjustable.

In the LPD device 200 of FIG. 4A-D, padding member 213 is disposed on sliding frame portion 217 to contact the patient's stomach when padding member 212 contacts the back side of the patient above the fit. The armature portion 214 preferably extends upward from the other portion of the frame 211 to provide more vertical space for hanging weights, and change the moment the applied force as the LPD device 200 tilts forward away from the front of the patient 1. In another variant of the LPD device 200 of FIG. 4A-D, the armature 214' is positioned to extent outward to the side of the patient 1.

Figure 6:
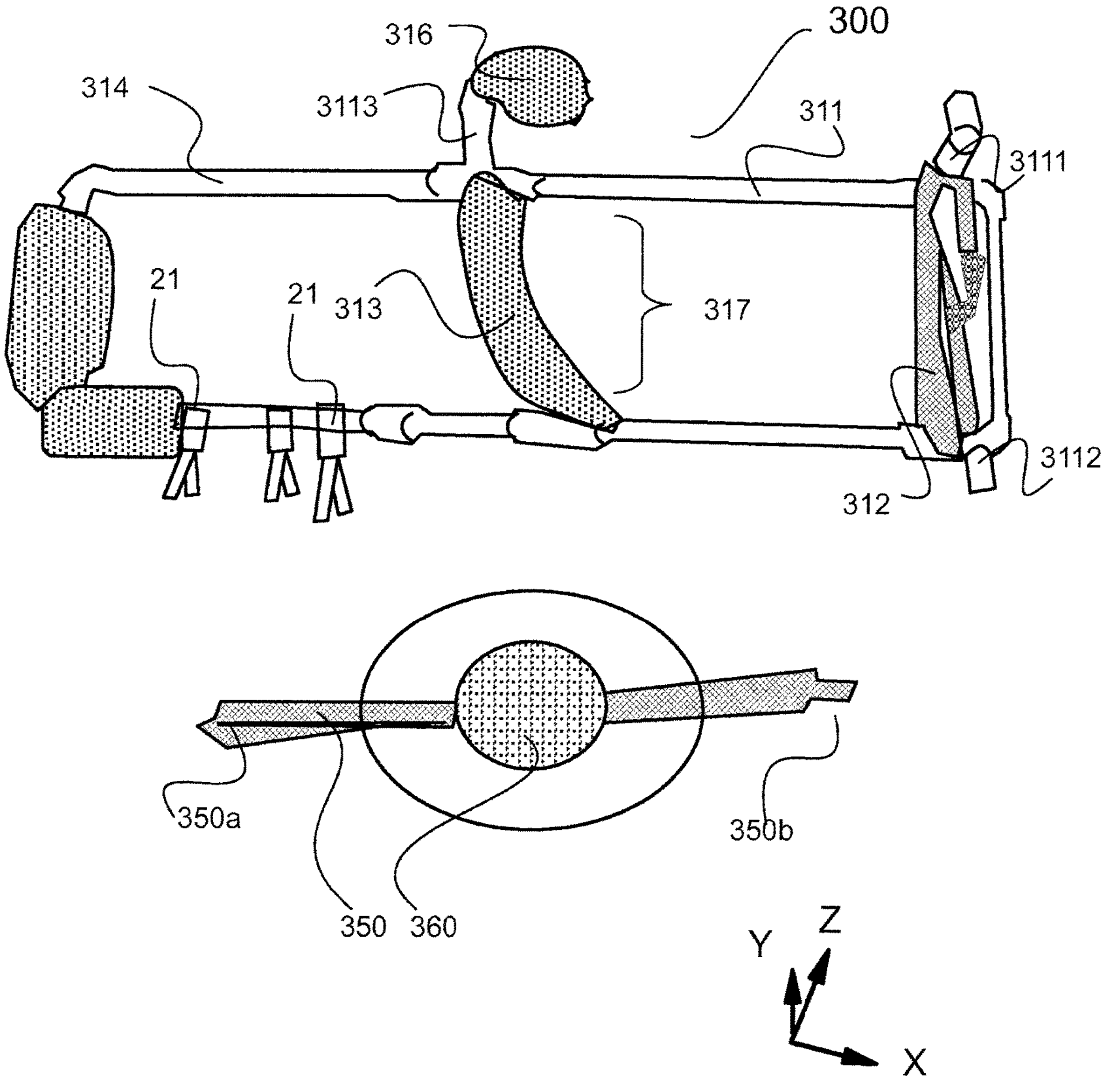
FIG. 6 is a perspective view of the TLT 300 device.
Figure 7:
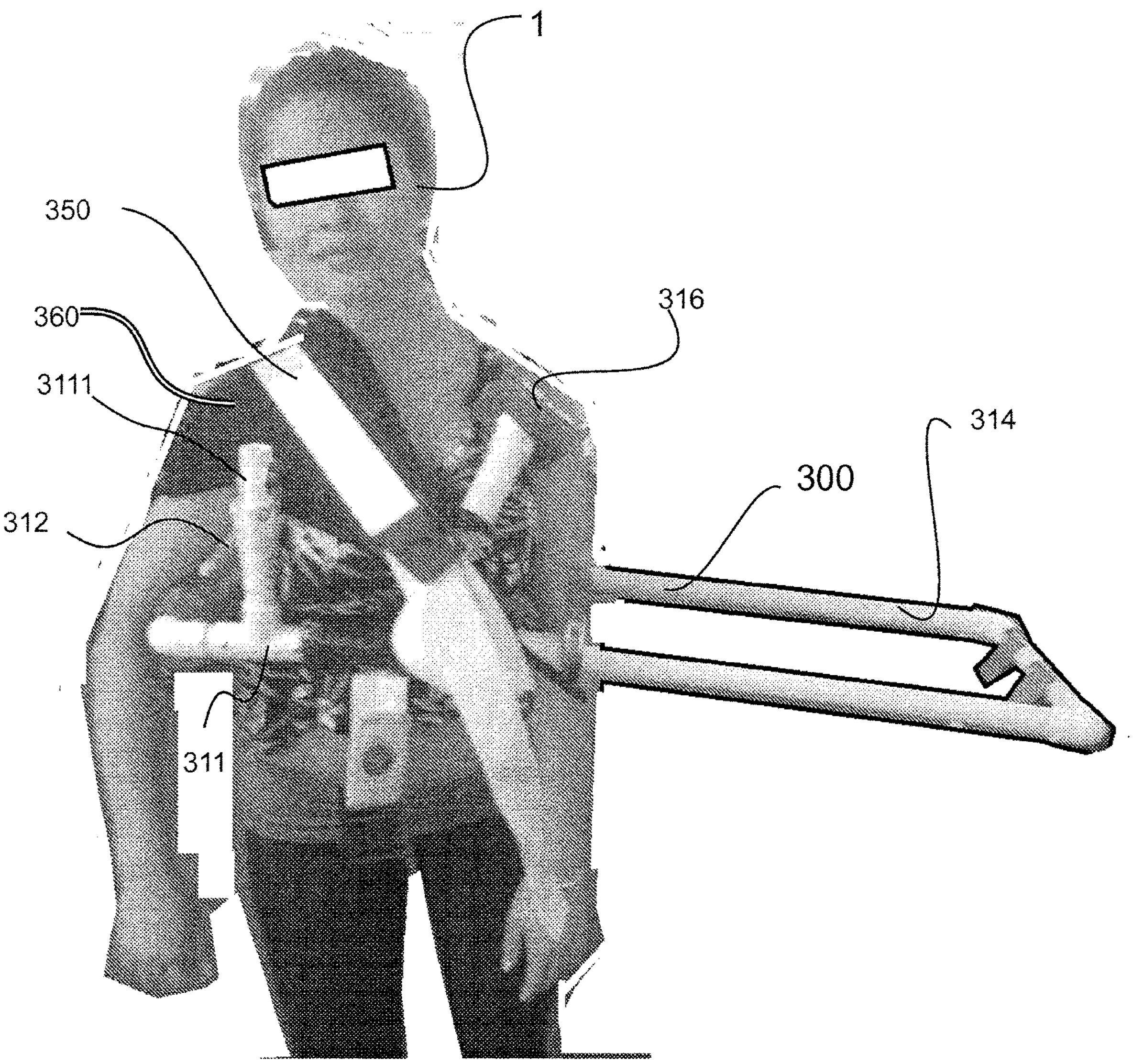
FIG. 7 is a front elevation view of a patient wearing the TLT 300 device of FIG. 6.

In the TLT 300 of FIG. 6, the frame 311 is also intended to surround the patient, with curved padding member 313 on a curved sliding portion 317 that is intended to contact the patient side above the hip as shown in FIG. 7, with the opposite side of the patient being contacted by a padding member 312 which is formed of a wide strapping material held between standoff 3111 and 3112 that extend upward from the plane of frame 311. Also positioned on a third standoff 3113 that extends upward form the plane of the frame 311 is a preferably padded patient contacting member 316. The frame 311 is supported on the body by strap 350, which is connect to a padded oval flexible member 360 generally shaped and intended to fit over and conform to the shape of the shoulder as shown in FIG. 7, in which is connected at opposing strap ends 350*a* and 350*b* to the opposing sides of the frame 311 proximal to sliding portion 317. Further, the armature portion 314 of frame 311 can slide with respect to the other portions to adjust the applied corrective force by varying the distance from the patient's torso. The sliding portion of frame 311 is held in place by several illustrated clamps 21, which preclude movement beyond the concentric piping junction of the frame portions.

Figure 8:
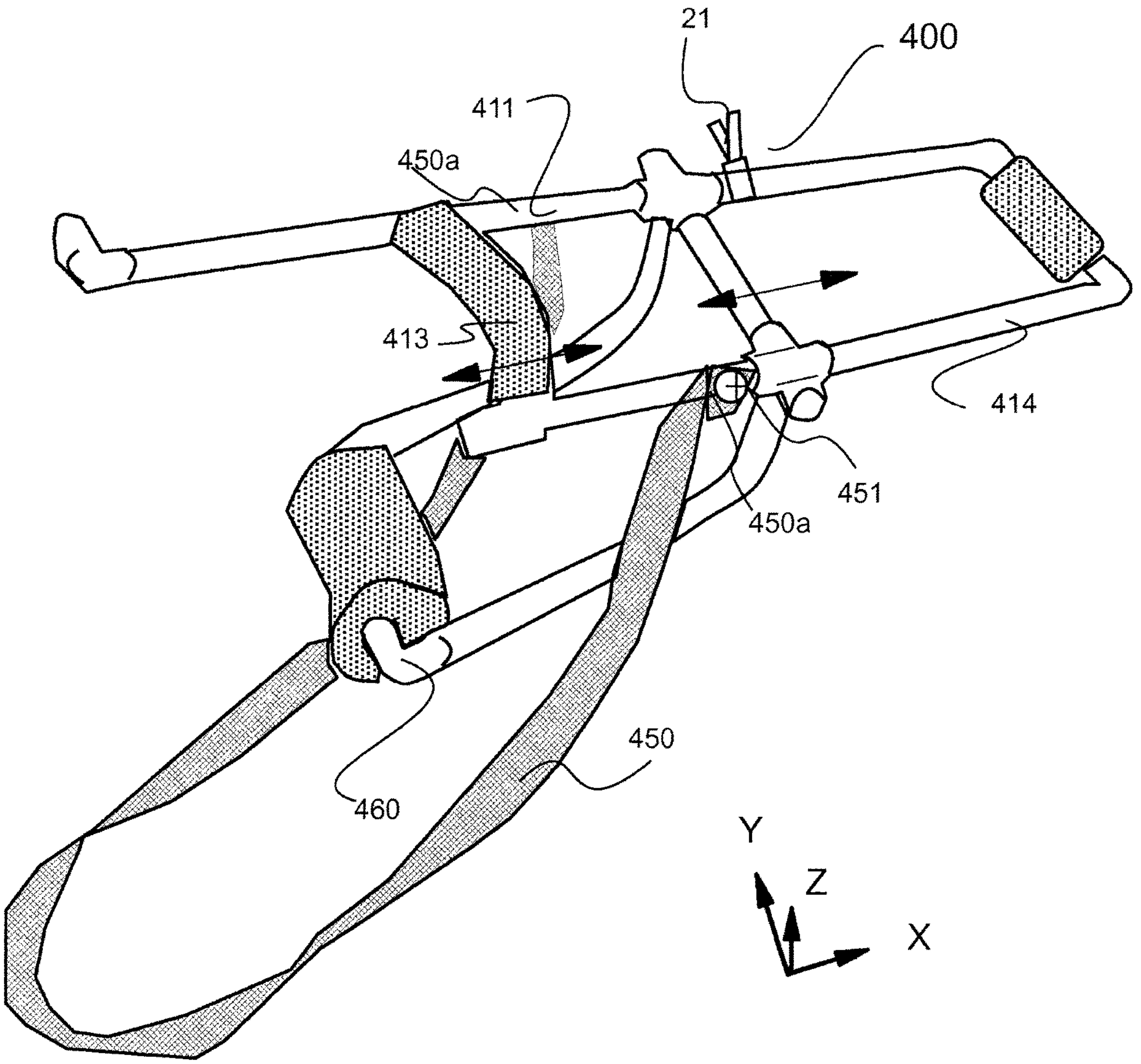
FIG. 8 is a perspective view of the LLL 400 device.
Figure 9:
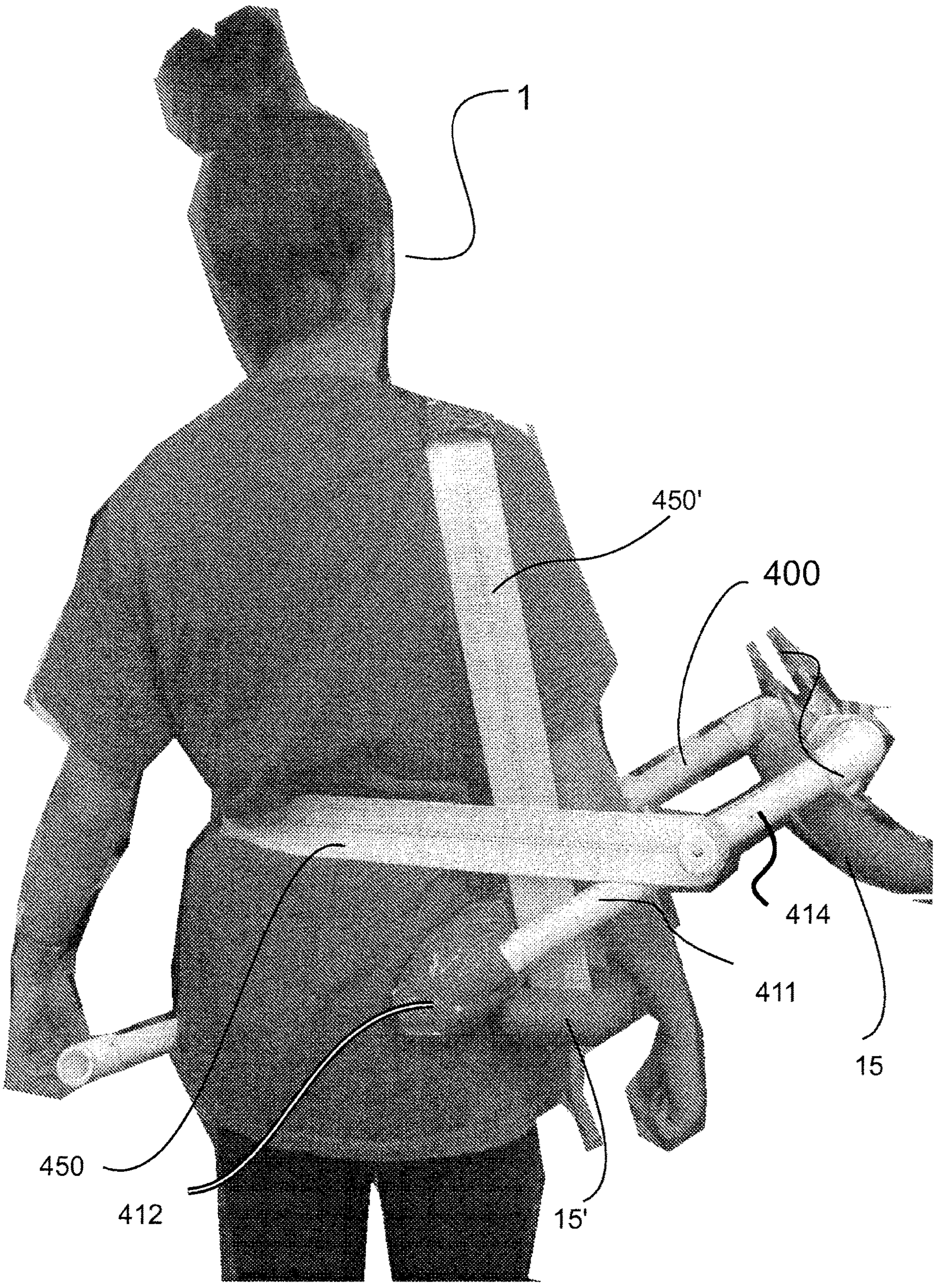
FIG. 9 is a rear elevation view of a patient wearing the TLT of FIG. 8.

In the LLL 400 of FIG. 8, the rigid portion of frame 411 are not intended to surround the patient, but rather strap 450 is tensioned on the torso above the hip as shown in FIG. 9 to urge the curved padded portion 413 of the frame 411 against the hip bone of the opposite side of the patient 1, which is proximal to weight loaded armature 414. In a preferred mode of use, the patient 1, wears a weight 15' hanging by an additional strap 450' over the shoulder above the curved padded portion 413.

The padded leg buttress 460 of the LLL 400 is an optional component to as supplement to straps 450, and would not contact the patient 1 in normal use, as it is mainly for their feeling of security when armature 414 is loaded with weight 15, as they are standing on a balance pad 703. Strap 450 is preferably formed of two parts with an intermediate buckle, not shown, for tightening, and preferably has axial pivoting connections 451 to the frame 411 at ends 450*a*. The axial pivoting connections 451 provide a fulcrum for the amplification of the weight 15 at the distal end of armature 414 for the lateral transfer of force from waist region above the hip to opposite hip via the curved padded portion 413. The LLL provides an exponential increase in force as the strap 450 and frame portion 411 become closer to parallel.

The inventive devices more fully correct conditions not treatable by the prior art SLA. The inventive devices also prevent an abnormal twist in some areas during the training period of wearing the weights; for example the DUD SLA 100 corrects abnormal twist between the upper thoracic and middle thoracic curves. The LPD 200 corrects abnormal twist between the pelvis and the lumbar apex. The area between the lumbar apex and the thoracic apex must fully correct under its own muscular strength that is selectively enhanced passively from repetitive periods of active training. The area between the lumbar and thoracic spine must un-twist on its own strength. This can be enhanced by applying a resistance band between the DUD SLA 100 and the LPD 200 when they are both worn at the same time, as shown in FIG. 5.

The various frames are padded at the point of contact with the body, however the padding may extend over other parts of the frame that would not normally contact the body to facilitate fabrication or maintain the padding positions, that is prevent their being urged to another less functional position by the reactive force of the patient's body.

Active Exercise correction is provided by the weights that is generally placed at the most distal end of the devices armature, i.e., on the far end of the DUD SLA 100 and LPD 200 for example, which causes the body to be offbalanced, and to react in a way such that the body's own core muscles pull the scoliosis straighter, especially in the region of the primary thoracic curve in the lower half of the thoracic spine, and in the compensatory lumbar curve below.

Several unique aspect of the DUD SLA 100 is the support belt on concave side. In contrast, the prior art SLA places the shoulder support belt on the convex side of the primary thoracic curve. This adds risk of a larger upper tsp curve being created by the compressive pressure of the shoulder belt over the concave side of the upper tsp/DUD curve.

Typically in a prior art SLA, the primary thoracic curve may correct in exercise, while the secondary upper tsp curve (the DUD curve) may become larger in curve size, countering the beneficial effect of correcting the lower part of the primary tsp curve.

In using the inventive DUD SLA 100, the belt or strap is placed over the concave side of the primary tsp curve—The standard SLA has the belt over the shoulder of the convex side Placing the belt over the concave side provides excellent compressive correction of the upper tsp/DUD curve, but will typically cause the entire SLA to become destabilized and fall too low off the body.

The stability problem that occurs when the support belt is placed on the concave side has been solved by adding the de-rotation padded contact points on the sides of the frame, 212 in FIG. 3A-F and 118 in FIG. 4A-F. In a DUD SLA 100 the shoulder support belt is on the concave side of the primary thoracic (and hence the convex side of the upper secondary compensatory tsp curve), to reduce and improve the curvature in the upper tsp/DUD as well as the primary thoracic curve.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A system for treatment of spinal scoliosis, comprising:

a locking lumbar leverarm including a frame, a strap, and a weight, the frame having a first portion configured to engage against a first hip of a person on a first side of the person, the frame having a second portion that is connected to the first portion of the frame, the second portion of the frame extending away from the first portion of the frame to a distal end of the second portion of the frame, wherein the distal end of the second portion of the frame is configured to be positioned laterally outward from the first hip of the person, the strap configured to extend from the second portion of the frame around a second side of the person that is opposite from the first side of the person, the strap configured to engage the second side of the person at a location above a second hip of the person that is opposite from the first hip of the person, the weight loaded onto the distal end of the second portion of the frame; and a weighted shoulder strap configured to extend over a first shoulder of the person on the first side of the person, the weighted shoulder strap configured to pull downward on the first shoulder of the person, wherein the weighted shoulder strap includes a strap portion and a bottom weight, the strap portion configured to extend from the bottom weight upward past the second portion of the frame of the locking lumber leverarm and upward past the strap of the locking lumber leverarm and over the first shoulder of the person and downward past the strap of the locking lumber leverarm and downward past the second portion of the frame of the locking lumber leverarm to the bottom weight.

2. The system as recited in claim 1, wherein the strap of the locking lumbar leverarm is connected to the second portion of the frame of the locking lumbar leverarm at a location away from the first portion of the frame of the locking lumbar leverarm.

3. The system as recited in claim 2, wherein the second portion of the frame of the locking lumbar leverarm includes an anterior member and a posterior member, the first portion of the frame of the locking lumbar leverarm extending between the anterior and posterior members of the second portion of the frame of the locking lumbar leverarm, wherein the distal end of the second portion of the frame of the locking lumbar leverarm is formed by a distal member extending between the anterior and posterior members of the second portion of the frame of the locking lumbar leverarm.

4. The system as recited in claim 3, wherein a first end of the strap of the locking lumbar leverarm is connected to the anterior member of the second portion of the frame of the locking lumbar leverarm by a first axial pivoting connection, and wherein a second end of the strap of the locking lumbar leverarm is connected to the posterior member of the second portion of the frame of the locking lumbar leverarm by a second axial pivoting connection.

5. The system as recited in claim 2, wherein the location at which the strap is connected to the second portion of the frame of the locking lumber leverarm is adjustable.

6. The system as recited in claim 2, wherein a tension of the strap is adjustable.

7. The system as recited in claim 2, wherein the strap is connected to the second portion of the frame of the locking lumber leverarm by way of axial pivoting connections.

8. The system as recited in claim 7, wherein each of the axial pivoting connections provides a fulcrum for lateral transfer of a therapeutic force by the strap to the second side of the person at the location above the second hip of the person, and wherein a distance of the axial pivoting connections away from the first portion of the frame is set to control an amplification of the weight loaded onto the distal end of the second portion of the frame to generate the therapeutic force.

9. The system as recited in claim 8, wherein a length of the second portion of the frame is adjustable to provide control of a distance between the distal end of the second portion of the frame and locations of the axial pivoting connections along the second portion of the frame.

10. The system as recited in claim 1, further comprising:

a balance pad upon which the person stands while wearing the locking lumbar leverarm and the weighted shoulder strap.

11. The system as recited in claim 1, further comprising:

a pad disposed on the first portion of the frame, the pad positioned to engage the first hip of the person.

12. A method for treatment of spinal scoliosis, comprising:

fitting a person into a locking lumber leverarm, the locking lumber leverarm having a frame, a strap, and a weight, the frame having a first portion positioned against a first hip of the person on a first side of the person, the frame having a second portion that is connected to the first portion of the frame, the second portion of the frame extending away from the first portion of the frame to a distal end of the second portion of the frame, wherein the distal end of the second portion of the frame is positioned laterally outward from the first hip of the person, the strap configured to extend from the second portion of the frame around a second side of the person that is opposite from the first side of the person, the strap tightened against the second side of the person at a location above a second hip of the person that is opposite from the first hip of the person, the strap connected to the second portion of the frame at a location away from the first portion of the frame, the weight loaded onto the distal end of the second portion of the frame causing the strap to apply a therapeutic force to the second side of the person so as to correct a scoliotic curvature of the spinal column of the person;

applying a weighted shoulder strap over a first shoulder of the person on the first side of the person, such that the weighted shoulder strap pulls downward on the first shoulder of the person in conjunction with the strap applying the therapeutic force to the second side of the person, wherein the weighted shoulder strap includes a strap portion and a bottom weight, the strap portion configured to extend from the bottom weight upward past the second portion of the frame of the locking lumber leverarm and upward past the strap of the locking lumber leverarm and over the first shoulder of the person and downward past the strap of the locking lumber leverarm and downward past the second portion of the frame of the locking lumber leverarm to the bottom weight; and having the person wear the locking lumber leverarm and the weighted shoulder strap while the person maintains a standing position with substantially straight posture for a prescribed period of time.

13. The method as recited in claim 12, wherein the second portion of the frame of the locking lumbar leverarm includes an anterior member and a posterior member, the first portion of the frame of the locking lumbar leverarm extending between the anterior and posterior members of the second portion of the frame of the locking lumbar leverarm, the distal end of the second portion of the frame of the locking lumbar leverarm formed by a distal member extending between the anterior and posterior members of the second portion of the frame of the locking lumbar leverarm.

14. The method as recited in claim 13, wherein a first end of the strap of the locking lumbar leverarm is connected to the anterior member of the second portion of the frame of the locking lumbar leverarm by a first axial pivoting connection, and wherein a second end of the strap of the locking lumbar leverarm is connected to the posterior member of the second portion of the frame of the locking lumbar leverarm by a second axial pivoting connection.

15. The method as recited in claim 14, wherein each of the first axial pivoting connection and the second axial pivoting connection provides a fulcrum for lateral transfer of a therapeutic force by the strap to the second side of the person at the location above the second hip of the person.

16. The method as recited in claim 15, further comprising:

setting a distance of the first axial pivoting connection away from the first portion of the frame and a distance of the second axial pivoting connection away from the first portion of the frame to control an amplification of the weight loaded onto the distal end of the second portion of the frame to generate the therapeutic force.

17. The method as recited in claim 16, further comprising:

adjusting a length of the second portion of the frame to control a distance between the distal end of the second portion of the frame and locations of the first axial pivoting connection and the second axial pivoting connection along the second portion of the frame.

18. The method as recited in claim 12, further comprising:

having the person stand and balance on a balance pad while wearing the locking lumbar leverarm and the weighted shoulder strap for the prescribed period of time.

19. The method as recited in claim 12, wherein the location at which the strap is connected to the second portion of the frame of the locking lumber leverarm is adjustable.

20. The method as recited in claim 12, wherein a tension of the strap is adjustable.

* * * * *